United States Patent [19]

Yoshida

[11] 4,451,929
[45] May 29, 1984

[54] PATTERN DISCRIMINATION METHOD

[75] Inventor: Hajime Yoshida, Tokyo, Japan

[73] Assignee: Hajime Industries Ltd., Japan

[21] Appl. No.: 352,809

[22] Filed: Feb. 26, 1982

Related U.S. Application Data

[63] Continuation-in-part of Ser. No. 109,969, Jan. 7, 1980, abandoned.

[30] Foreign Application Priority Data

Nov. 10, 1978 [JP] Japan ................................ 53-138578

[51] Int. Cl.³ ............................................. G06K 9/66
[52] U.S. Cl. ..................................................... 382/15
[58] Field of Search ...................................... 382/14, 15

[56] References Cited

U.S. PATENT DOCUMENTS

| | | | |
|---|---|---|---|
| 3,191,149 | 6/1965 | Andrews | 382/15 |
| 3,191,150 | 6/1965 | Andrews | 382/15 |
| 3,333,248 | 7/1967 | Greenberg et al. | 382/15 |
| 3,457,552 | 7/1969 | Asendorf | 382/15 |
| 3,548,202 | 12/1970 | Ide et al. | 382/15 |
| 3,581,281 | 5/1971 | Martin et al. | 382/15 |
| 3,582,898 | 6/1971 | LeMay | 382/15 |
| 3,623,015 | 11/1971 | Schmitz | 382/15 |
| 4,201,977 | 5/1980 | Shimizu | 382/15 |

FOREIGN PATENT DOCUMENTS 1338287  11/1973  United Kingdom .................. 382/15

Primary Examiner—Leo H. Boudreau
Assistant Examiner—Michael D. Parker

[57]  ABSTRACT

A pattern discrimination method is disclosed which judges that, when the difference between the data from an object or subject to be inspected and previously memorized data of a standard subject falls within a first predetermined value, the object belongs to the same kind of the standard subject. In this case, the difference between the data of the object and the previously memorized data of the standard subject is compared with a second predetermined threshold value smaller than the first predetermined value. When the difference is smaller than the second predetermined threshold value, the memorized data is revised in response to the new data from the object.

2 Claims, 6 Drawing Figures

FIG.6

PATTERN DISCRIMINATION METHOD

This is a continuation-in-part application of Ser. No. 109,969, filed Jan. 7, 1980 now abandoned.

BACKGROUND OF THE INVENTION

1. Field of the Invention

The present invention relates generally to a pattern discrimination method, and is directed more particularly to a method for pattern discrimination that includes an automatic revising function which enables discrimination with high precision.

2. Description of the Prior Art

Pattern discrimination systems of the prior art are known to conduct pattern (subjects of inspection) discrimination as generally outlined in FIG. 1. A generally steady light from a light source 3, powered by a stabilized power source 2, illuminates an object or subject to be inspected. A camera 4 such as a television camera produces a photoelectric signal in response to an image of the inspected subject 1. The photoelectric signal is sent to a pattern discrimination system 5 from the camera 4 where an attempt is made to discriminate the pattern of subject 1. The data fed to pattern discrimination system 5 inevitably change over time even though the inspected subject 1 remains the same. Even though the power to the light source 3 is supplied from a stabilized power source 2, the light from the light source 3 does not remain constant due to aging and other causes. In addition, camera 4 shows changes in the video signal therefrom due to drift, environmental temperature changes, etc. Accordingly, the judgment by the pattern discrimination system 5 is inevitably influenced by such changes and the misjudgment ratio for discrimination increases.

OBJECTS AND SUMMARY OF THE INVENTION

It is noted, however, that such normal environmental temperature changes or camera drift are quite gradual. When long time periods are involved, the changes in the difference between the inspected subject and the standard subject due to such changes or drift cannot be ignored, but for very short time periods, or when continuous discrimination of the inspected subjects is conducted, since the short-term changes in difference is very small, such difference can be judged as due to changes with time.

Therefore, it is an object of the present invention to provide a pattern discrimination method having an automatic revising function that avoids an increase in the misjudgment ratio by the pattern discrimination system by absorbing such changes in the output video signal from a camera that are influenced by environmental temperature and other changes.

According to an aspect of the present invention, a pattern discrimination method is provided which judges that an object to be inspected is the same type as a standard subject when the difference between data of the inspected object and previously memorized data of a standard subject is within a predetermined value, comprising the steps of comparing the difference between the data of the object to be inspected and previously memorized data of the standard subject with a predetermined threshold value, and revising the memorized data of the standard subject by the data of the inspected object when the above difference is lower than the threshold value.

According to a further aspect of the present invention, there is provided a method of pattern discrimination in a pattern inspection apparatus of the type having a light source for illuminating an object to be inspected, a video camera effective to produce an electrical signal corresponding to the object, and a pattern discrimination system for comparing data from the electrical signal with standard data memorized from a standard subject of a type to be recognized to determine whether the object is of the same type as the standard subject comprising the steps of setting a first threshold A for determining whether or not the data from the electrical signal contains characteristics sufficiently close to the standard data to judge the object to be of the same type as the standard subject, setting a second threshold B smaller than the first threshold A for determining whether or not the data from the electrical signal contains characteristics sufficiently close to the standard data to judge the object to be substantially identical to the standard subject, determining a difference between the characteristics of the data and the standard data, producing a match signal if the difference is less than the first threshold A, and replacing the standard data with the data if the difference is less than the second threshold B.

The above, and other objects, features and advantages of the present invention will become apparent from the following description read in conjunction with the accompanying drawings in which like reference numerals designate the same elements.

BRIEF DESCRIPTION OF THE DRAWINGS

FIG. 6 is a matrix to which reference will be made in explaining the present invention.

DETAILED DESCRIPTION OF THE PREFERRED EMBODIMENT

Figure 1:
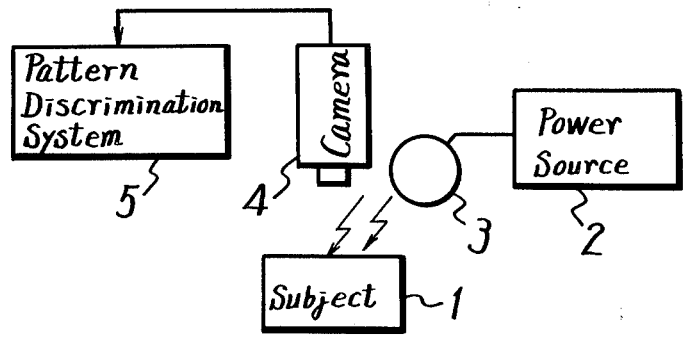
FIG. 1 illustrates a block schematic diagram which shows an example of a pattern discrimination system under the prior art.
Figure 2:
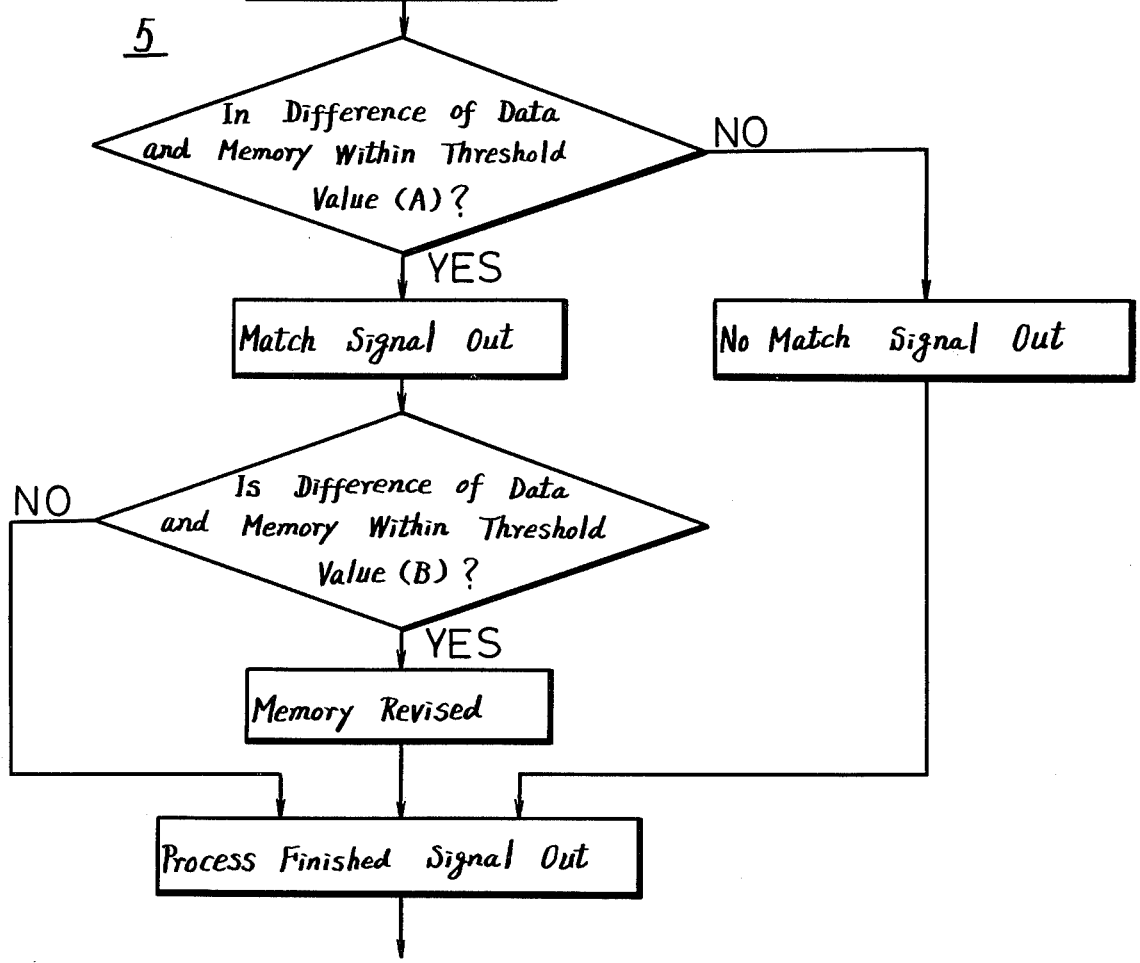
FIGS. 2 and 3 are flow charts to which reference will be made in explaining the present invention.

Referring to the flow chart on FIG. 2, camera 4 produces data corresponding to an object to be inspected. Pattern discrimination system 5 calculates the difference between the data from camera 4 and the data of an applicable closest standard subject previously memorized. When the difference between the memorized data and the new data is larger than a predetermined threshold value A, a non-match signal is delivered. On the other hand, when the difference between the memorized data of the applicable standard subject and the taken in data is smaller than the threshold value A, a match signal is delivered. As a further step, investigation is made whether or not the difference between the memorized data and the new data is smaller than a separately predetermined value or threshold value B and when the difference is within the threshold value B, the applicable memorized data is revised by the new data. In the same respect, when the difference between the memorized data and new data is larger than the threshold value B, no revision is made to the memorized data.

In spite of changes in environmental temperature or camera drift, etc., over time, since changes owing to such causes are very small within short time periods, appropriate selection of the threshold value B makes it possible to absorb such changes of differences so that pattern discrimination may be conducted with high reliability over extended periods of time.

Figure 3:
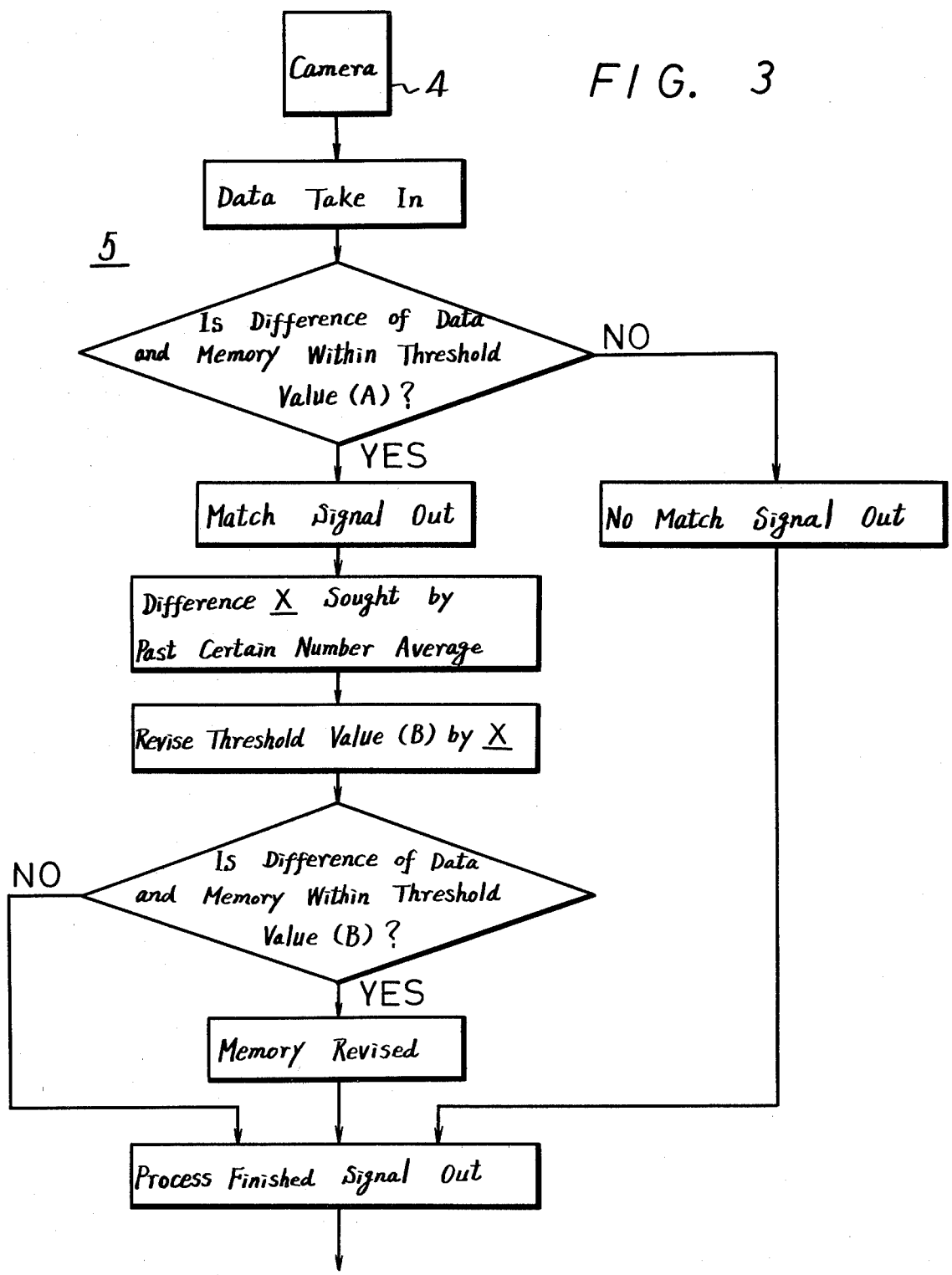

FIG. 3 is a flow chart illustrating another embodiment of this invention. In the embodiment of FIG. 3, when the difference between the newly taken in data and the memorized data of an applicable standard subject is smaller than the threshold value A, the match signal is delivered and further checking is performed to compare such difference with an average $\underline{X}$ of a predetermined number of past data samples with the threshold value B which is adjusted in accordance with the thus calculated difference $\overline{X}$ in order to revise the applicable memory data is made. Thus, the reliability of judgment is further increased.

Figure 4:
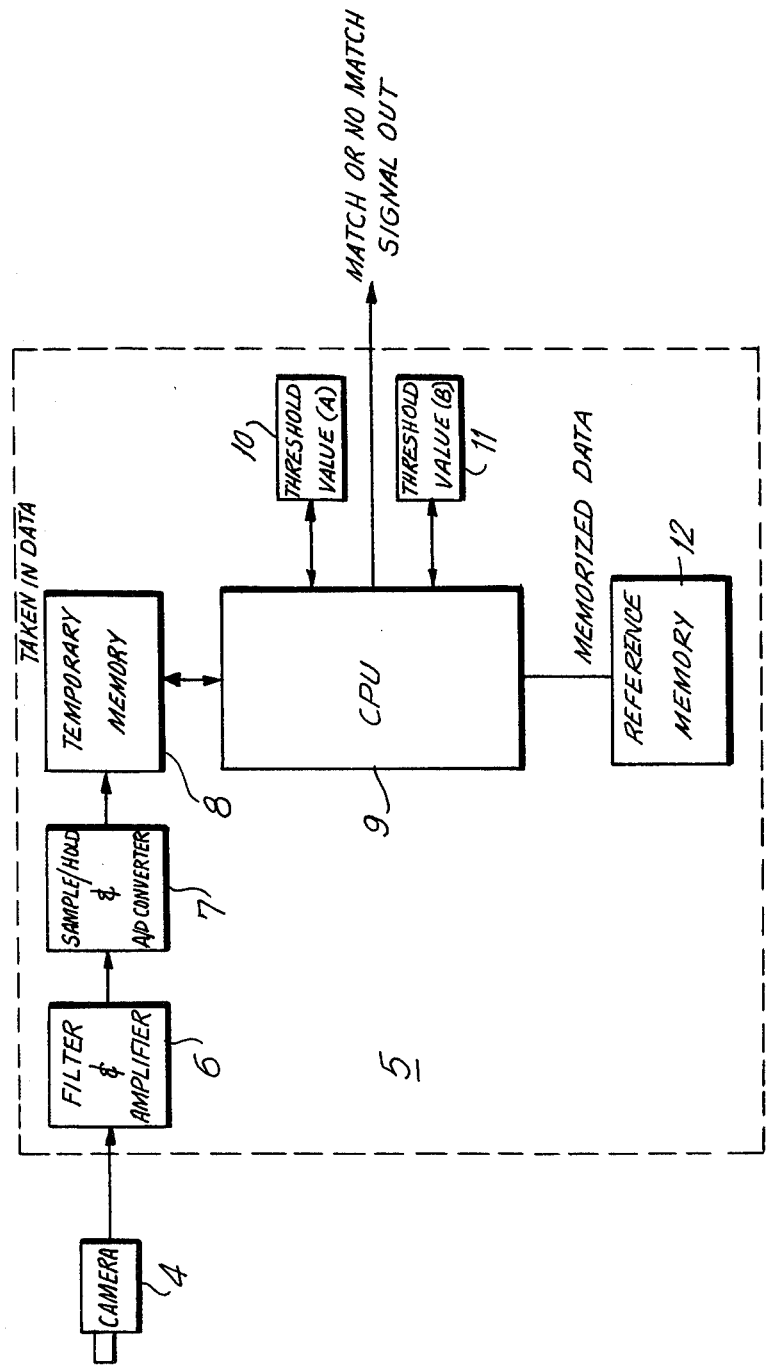
FIG. 4 is a block diagram of one embodiment of the invention.

Referring now to FIG. 4, camera 4 is a conventional television sensor capable of converting an image pattern of an inspected object into an electric signal. Any conventional camera may be employed including, for example, CCTV, matrix array, etc. In case of the mentioned cameras, a sensed frame of an image is divided into a plurality of picture elements or pixels. The portion of the pattern on each picture element is respectively photoelectrically converted to produce a video signal. The video signals are supplied to a filter and amplifier 6 wherein noise and unnecessary high frequency content are filtered from the video signal and the filtered signal is then amplified. The amplified video signal is supplied to a sample and hold and A/D converter 7. At this point, the video signal is converted into digital data and is supplied to a temporary memory 8, for temporary storage.

Initially, the data from a standard subject in the temporary memory 8 is transferred through a central processing unit 9 (CPU) and stored in a reference memory 12. CPU 9 may be, for example, an 8080 microprocessor made by Intel Corp. or a Z-80 microprocessor made by Zilog Corp. Then, the data from an object to be inspected is similarly temporarily stored in temporary memory 8. This new data is compared with the data already stored in the reference memory 12 by CPU 9. As a comparison function, when the difference between the new data from the object to be inspected in temporary memory 8 and the memorized data of the standard subject in reference memory 12 falls within a predetermined range A stored in a threshold value register 10, the CPU 9 outputs a match signal to indicate the pattern to be inspected and the standard pattern are judged to be the same. When the difference between the two quantities exceeds threshold value A, the CPU 9 outputs a no match signal. The memorized data in reference memory 12 may be a plural number.

As a further next step, when the difference between the memorized data and the new data is smaller than threshold value A, the difference is compared to a second threshold value B stored in threshold value register 11 which is prearranged to be smaller than threshold value A. Then, when this difference is smaller than threshold value B, the CPU 9 erases the memorized data from reference memory 12, and replaces it with the new data from temporary memory 8.

Threshold values A and B may be selected according to the nature of the object to be inspected to given an acceptable probability of correctly identifying the object if it is of the correct class with an acceptable probability of correctly excluding objects of a different class. Threshold value A can be, for example, 10 or 20 percent of the value of data of the subject and threshold B may be, for example, half threshold value A.

Figure 5:
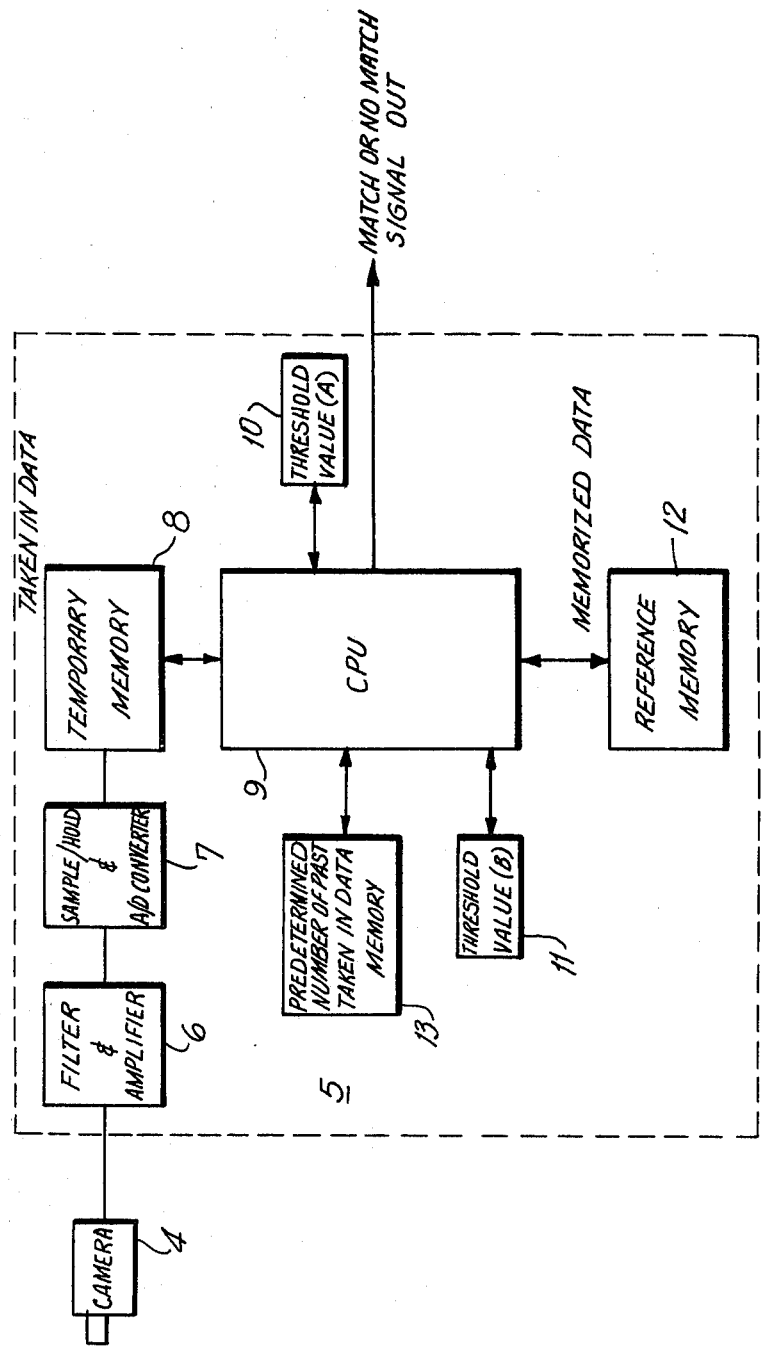
FIG. 5 is a block diagram of a second embodiment of the invention.

FIG. 5 illustrates another example of the present invention. The functions of producing match or no match signals based on comparison of the new data and memorized data are same as in the case explained for FIG. 4. A third memory 13 stores a predetermined number of samples of new data which do not exceed the threshold value A from among the consecutively incoming data samples.

Storage is on the basis of first in and first out. The CPU 9 calculates the average value $\underline{X}$ of the predetermined number of samples and uses the difference between this average value $\underline{X}$ and the memorized data in the reference memory 12 to determine whether such difference is less than the threshold value B. If the difference is less than threshold value B, the average value $\underline{X}$ is stored in threshold value register 11 to replace the data previously stored therein.

Any suitable number of consecutive samples satisfying threshold A may be used in the calculation of average value $\underline{X}$. For example, 2, 3, 10 or more samples may be used.

Therefore, while this threshold value B is a constant in the example of FIG. 4, it varies with time as new samples are employed to calculate the average value in FIG. 5. This changing value of B is then used to determine whether the memorized data should be replaced by the new data in reference memory 12.

Figure 6:
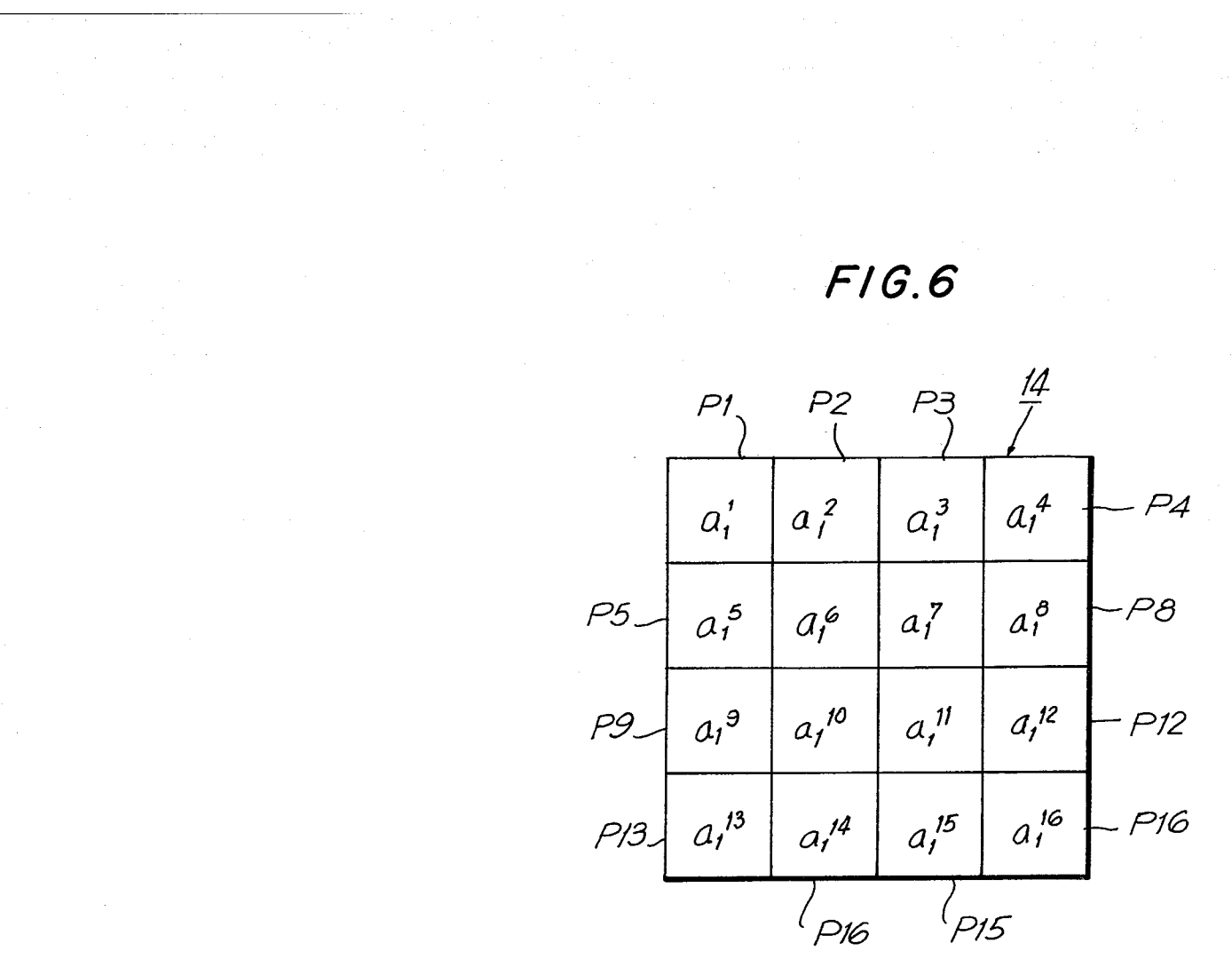

FIG. 6 illustrates an example of the photosensed picture 14 of camera 4. For purposes of illustration, the photosensed picture 14 is divided into 16 picture elements such as $P_1$, $P_2$ . . . $P_{16}$. By identifying the data responding to each picture element $P_1$ . . . $P_{16}$ on the photosensed picture 14 as a1-1 . . . a1-16 respectively, for the standard pattern which is taken to be the initial memorized data in the reference memory 12, whereas the responding data to picture elements $P_1$ . . . $P_{16}$ of the pattern for the inspected object are identified as a2-1 . . . a2-16. At this point, the difference between each responding data, such as a1-1 and a2-1, a1-2 and a2-2 . . . a1-16 and a2-16 are compared to the threshold value A by CPU 9, and thereafter the function as explained for the example cases on FIG. 4 and FIG. 5 follows. Although the example of FIG. 6 employs a picture 14 divided into 16 picture elements, wherein the data from each picture element is compared, it should be clear that the principle of the present invention may be applied to cases that adopt other data generating methods.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of pattern discrimination in a pattern inspection apparatus of the type having a light source for illuminating an object to be inspected, a video camera effective to produce an electrical signal corresponding to said object, and a pattern discrimination system for comparing data from said electrical signal with standard data memorized from a standard subject of a type to be recognized to determine whether said object is of the same type as said standard subject comprising the steps of:

setting a first threshold A for determining whether or not said data from said electrical signal contains characteristics sufficiently close to said standard data to judge said object to be of the same type as said standard subject;

setting a second threshold B smaller than said first threshold A for determining whether or not said data from said electrical signal contains characteristics sufficiently close to said standard data to judge said object to be substantially identical to said standard subject;

determining a difference between said characteristics of said data and said standard data;

producing a match signal if said difference is less than said first threshold A; and replacing said standard data with said data if said difference is less than said second threshold B.

2. A method according to claim 1, wherein said step of replacing includes averaging said data falling within said threshold A over a predetermined number of operations and replacing said standard data with the averaged data when the average falls within said threshold B.

* * * * *